July 21, 1959     S. C. SABO     2,895,168
AIR SPRING VULCANIZING MOLD
Filed July 30, 1958
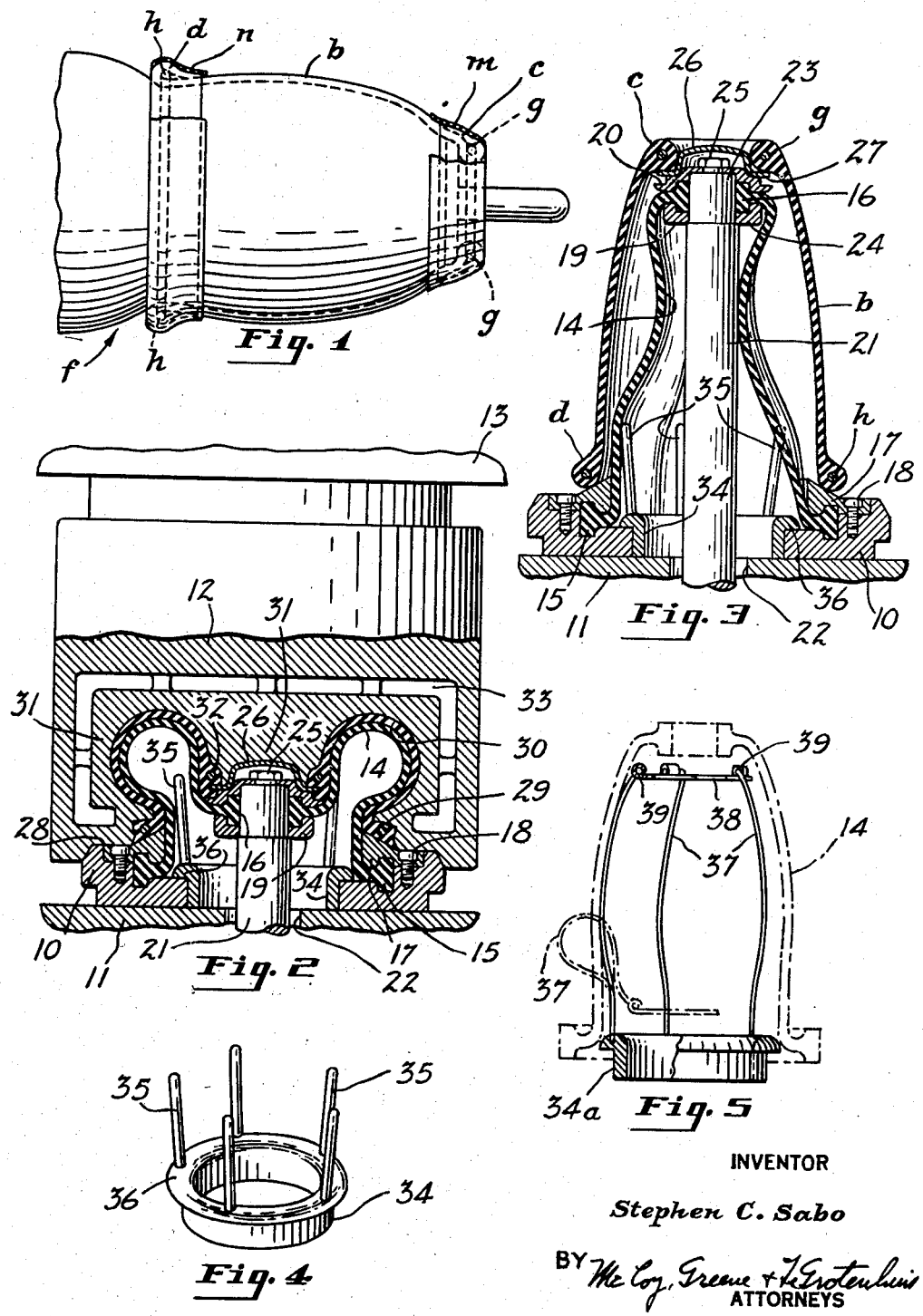
INVENTOR
Stephen C. Sabo
BY *McCoy, Greene & Te Grotenhuis*
ATTORNEYS

2,895,168
AIR SPRING VULCANIZING MOLD
Stephen C. Sabo, Barberton, Ohio, assignor to The General Tire & Rubber Company, Akron, Ohio, a corporation of Ohio
Application July 30, 1958, Serial No. 752,008
6 Claims. (Cl. 18—35)

This invention relates to vulcanizing molds and more particularly to molds for shaping and vulcanizing an air spring bellows, and is a continuation in part of my copending application Serial No. 698,099, filed Nov. 22, 1957.

The mold of the present invention is designed to shape a tubular bell-shaped bellows blank formed of fabric and uncured rubber by expanding one end of the blank to a considerably enlarged diameter and displacing the small end into the enlarged portion so as to provide a reentrant, flexible bellows end wall that provides a yielding support that is movable axially toward or away from the large end of the bellows when the bellows is subjected to internal air pressure. The bellows blank is formed by pressing it against the wall of the mold cavity during vulcanization and a tubular expansible elastic rubber diaphragm is employed to apply pressure to the interior of the blank during vulcanization.

The mold comprises an upper member provided with a cavity that conforms to the exterior of the bellows and a lower member that has sealing engagement with the upper mold member around the mold cavity when the mold is closed. The lower end of the tubular diaphragm is clamped to the lower mold member. The lower end of the tubular diaphragm is of a diameter to be received within the larger end of the bell shaped bellows blank and the upper end of the diaphragm is of a diameter to be received within the upper end of the blank. In closing the mold the upper ends of the blank and diaphragm are moved axially downwardly toward their lower ends while the walls of the diaphragm and blank are expanded radially into the peripheral portions of the mold cavity. In order to facilitate the placing of the bellows blank upon the diaphragm with its lower end resting on the lower mold member, the diaphragm is subjected to sufficient vacuum to collapse the wall of the diaphragm sufficiently to contract it to a size that will not interfere with the placing of the bellows. After the bellows blank is positioned on the lower mold member the vacuum is released, the upper mold member is moved downwardly into engagement with the lower mold member and air under pressure is applied to the interior of the diaphragm to press the wall of the blank against the cavity wall during vulcanization.

Collapse of a tubular elastic diaphragm by reduction of internal air pressure is apt to be non-uniform and ineffective to adequately reduce all radial dimensions particularly after the bag has been used repeatedly. During closing of the mold the bellows blank and diaphragm are collapsed axially by pressure exerted thereon by the mold member and it is desirable to hold the diaphragm against radial inward collapse during closing of the mold.

In the mold of the present invention internal bracing means is provided that engages with the interior of the diaphragm at circumferentially spaced points to insure uniform collapse of the diaphragm when subjected to vacuum and to hold the diaphragm and bellows blank against radial inward collapse during closing of the mold.

The objects of the invention are to insure uniform collapse of the diaphragm when subjected to vacuum and to hold the diaphragm against radial inward collapse during closing of the mold.

Reference should be had to the accompanying drawings forming a part of this specification in which:

Figure 1 is a side elevation of a tubular bellows blank positioned on the form upon which it was built;

Fig. 2 is a vertical section through a mold embodying the invention;

Fig. 3 is a vertical section through the mold base, the diaphragm attached to the said base and a bellows blank mounted on the diaphragm, the diaphragm being shown in the position in which it is held for receiving the blank;

Fig. 4 is a perspective view of the diaphragm bracing device, and

Fig. 5 is a side elevation of a modified form of diaphragm bracing device, the diaphragm being shown in dotted lines.

The vulcanizing mold of the present invention is employed to form an air spring bellows from a tubular blank $b$ that is formed of fabric and rubber plies and that has beaded ends $c$ and $d$. The blank $b$ is formed on a suitable expansible form $f$ by wrapping the fabric and uncured rubber plies thereon to form a band, expanding one end of the band and cuffing the ends of the band so formed over inextensible bead rings $g$ and $h$ and then applying covering strips $m$ and $n$ of uncured rubber to the cuffed ends as shown in Fig. 1. The beaded end $c$ is of considerably smaller diameter than the end $d$ and the blank $b$ is substantially bell-shaped.

The bell-shaped bellows blank $b$ is expanded to its final form and vulcanized in a mold which, as shown in Fig. 2, has an annular base member 10 mounted on a lower press platen 11 and an upper mold member 12 attached to an upper press platen 13. An axially extensible radially expansible rubber diaphragm 14 which tapers upwardly and conforms substantially to the interior of the bellows blank $b$ when expanded has a beaded lower end 15 and a beaded upper end 16 of considerably smaller diameter. The lower beaded end 15 of the diaphragm is attached to the annular base member 10 of the mold by means of a clamping ring 17 which is secured to the base member 10 by bolts 18. A pair of clamping members 19 and 20 receive the upper beaded end 16 of the diaphragm between them and provide a closure for the upper end of the diaphragm which also serves as part of the means for centering the diaphragm in the mold. The clamping members 19 and 20 are attached to a vertically movable supporting means such as a rod 21 that extends vertically through an opening 22 in the press platen 11. The opening 22 is centrally disposed within the annular base member 10 and is preferably of a diameter greater than that of the rod 21 to provide a passage through which fluid under pressure may be supplied to the interior of the diaphragm or through which the fluid may be evacuated.

The lower clamping member 19 is in the form of a collar that fits upon a portion 23 of the rod 21 at the upper end thereof which is of reduced diameter, the member 19 being supported upon a shoulder 24 at the lower end of the reduced portion 23 of the rod. The upper clamping member 20 is in the form of a cap secured to the upper end of the rod 21 by a bolt 25. A closure disk 26, which is in the form of a cup-shaped stamping with a peripheral flange 27 is placed on the upper clamping member 20 prior to placing the tubular blank $b$ on the diaphragm 14, the flange 27 serving to support the upper beaded end $c$ of the blank during insertion of the blank into the mold. During the vulcanizing operation the flange 27 becomes embedded in the rubber of the bellows and provides a permanently attached closure member.

The bellows blank is placed upon the lower mold member 10 after the rod 21 has been raised to a position where the flange 27 of the cap 25 is at a height to engage with the small bead $g$ of the blank while the large end $h$ rests upon the clamping ring 17 as shown in Fig. 3, after which the mold members 10 and 12 are closed upon the bellows and diaphragm as shown in Fig. 2.

As shown in Fig. 2, the upper mold member 12 which is formed to receive the blank b and diaphragm 14 when when the mold is closed, has a recessed annular shoulder 28 that seats on the annular base 10 and clamping ring 17 when the mold is closed, and a second annular shoulder 29 within the shoulder 28 and offset upwardly with respect thereto that engages the beaded end d of the bellows blank and clamps the same against the top face of the clamping ring 17.

Above the shoulders 28 and 29 the mold member 12 is provided with an annular cavity 30 of generally toroidal form that surrounds a central downwardly projecting diaphragm positioning portion 31 that is recessed to receive the closure disk 26 and that is provided with a marginal shoulder 32 that engages with the small beaded end c of the bellows blank and clamps it to the flange 27 of the closure disk 26.

When the mold is closed the small end c of the bellows blank is moved downwardly to a position only a short distance above the level of the large end d and the flexible body of the blank and the inner diaphragm are bowed out into the annular cavity 30. After the mold is closed fluid under pressure is supplied through the opening 22 in the lower platen to apply pressure to the interior of the diaphragm to press the flexible body of the blank against the cavity wall. Heated fluid under pressure may be supplied to the interior of the diaphragm to vulcanize the blank and heat may also be applied to the upper mold member by steam or other heated fluid supplied to a suitable chamber 33 provided in the mold member.

As shown in Figs. 2 and 3, a ring 34 fits within the annular mold base 10 and provides a support for circumferentially spaced bars 35 that extend upwardly from a circumferential flange 36 of the ring 34 that rests upon the top face of the mold member 10. The bars 35 are closely adjacent the interior of the diaphragm and are preferably inclined outwardly at a slight inclination to the vertical. The bars are preferably uniformly spaced and are of a length to extend into the cavity 30 when the mold is closed. When the diaphragm 14 is in blank receiving position as shown in Fig. 3 and a sub-atmospheric pressure is created within it, the radial inward collapse of the diaphragm is positively restrained at a series of points regularly spaced circumferentially so that the portions of the diaphragm engaging the bars 35 will be held to uniform radial dimensions that will permit passage of the large end of the bellows blank and portions of the diaphragm above the bars 35 will be collapsed to a smaller diameter without objectionable distortion. The bars 35 hold the diaphragm 14 against inward collapse so that the diaphragm is constrained to expand into the annular cavity 30 substantially uniformly throughout its circumference during the closing of the mold.

An alternative form of diaphragm bracing means is shown in Fig. 5 in which a supporting ring 34a similar to the ring 34 supports a series of circumferentially spaced spring steel bars 37 that are shaped to conform substantially to the interior of the extended diaphragm. The bars 35 extend substantially the full length of the diaphragm and are bent into conformity with the interior of the diaphragm when the diaphragm is expanded into the annular portion 30 of the mold cavity. The spring bars 37 are connected at their upper ends to a ring 38 by means of pivots 39.

It is to be understood that in accordance with the provisions of the patent statutes, variations and modifications of the specific devices herein shown and described may be made without departing from the spirit of the invention.

What I claim is:

1. A mold for shaping and vulcanizing an air spring bellows comprising a base member, a tubular upwardly tapering elastic rubber diaphragm for engagement with the interior of a bell shaped bellows blank and having its larger end clamped to said base member, means forming a closure for the upper end of said diaphragm, an upper mold member having a cavity of less height than said diaphragm that is provided with a central opening of a size to permit entry of said diaphragm with a bellows blank thereon and with a portion of enlarged diameter above said opening, said upper mold member having an annular portion engageable with said base member around the exterior of said diaphragm, a portion engageable with the lower end of a bellows blank to clamp it to said base member and a portion enageable with the upper end of said bellows member to clamp it to the upper end of said diaphragm, and bracing means carried by said base member and extending upwardly therefrom within said diaphragm at circumferentially spaced points and adjacent its interior face to resist inward collapse of the diaphragm at said points during closing of the mold.

2. A mold according to claim 1, in which said bracing means comprises a series of upwardly extending circumferentially spaced bars.

3. A mold according to claim 2, in which each of said bars is flexible and resilient and bowed radially outwardly intermediate its ends.

4. A mold for shaping and vulcanizing an air spring bellows comprising a base member, an elongated tubular upwardly tapering elastic rubber diaphragm for supporting a tubular bell shaped bellows blank to be shaped and vulcanized, means for clamping the larger end of said diaphragm to said base member, a centrally disposed supporting member movable vertically with respect to said base member, means for closing the upper end of said diaphragm and clamping the same to said supporting member, an upper mold member having a cavity of less height than said diaphragm that is formed to provide a central opening of a size to permit entry of said diaphragm with a bellows blank thereon and two concentric downwardly facing annular shoulders surrounding said opening, the first of said shoulders being engageable with said base member and the second of said shoulders being within and offset upwardly from the first for engagement with the lower end of a bellows blank supported on said diaphragm to clamp the same to said base member, the central portion of said cavity being formed to provide a third annular shoulder for engagement with the upper end of the bellows blank to clamp the same to said movable support, said cavity having a generally toroidal portion above said second shoulder and surrounding said third shoulder, said second and third shoulders providing a restricted annular opening from the central portion of the cavity to said toroidal portion, and bracing means carried by the base member and extending upwardly therefrom within said diaphragm at circumferentially spaced points and adjacent its interior face to resist inward collapse of the diaphragm at said points during the closing of the mold.

5. A mold according to claim 4, in which said bracing means comprises a series of circumferentially spaced bars that extend upwardly from said base at a slight radial outward inclination and that are of a length to extend into said toroidal portion of the mold cavity when the mold is closed.

6. A mold according to claim 4 in which said bracing means comprises a series of circumferentially spaced flexible and resilient bars that extend substantially the full length of the diaphragm and that are bowed radially outwardly.

References Cited in the file of this patent

UNITED STATES PATENTS

| | | |
|---|---|---|
| 2,243,532 | Maynard | May 27, 1941 |
| 2,559,119 | Frank | July 3, 1951 |
| 2,775,789 | Soderquist | Jan. 1, 1957 |